(12) United States Patent
Maehara

(10) Patent No.: US 10,654,320 B2
(45) Date of Patent: May 19, 2020

(54) TIRE

(71) Applicant: SUMITOMO RUBBER INDUSTRIES, LTD., Kobe-shi (JP)

(72) Inventor: Atsushi Maehara, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 508 days.

(21) Appl. No.: 15/440,005

(22) Filed: Feb. 23, 2017

(65) Prior Publication Data
US 2017/0253088 A1    Sep. 7, 2017

(30) Foreign Application Priority Data

Mar. 4, 2016   (JP) .................................. 2016-042414

(51) Int. Cl.
*B60C 11/11*   (2006.01)
*B60C 11/12*   (2006.01)
(Continued)

(52) U.S. Cl.
CPC .......... *B60C 11/04* (2013.01); *B60C 11/0304* (2013.01); *B60C 11/11* (2013.01);
(Continued)

(58) Field of Classification Search
CPC ................. B60C 11/11; B60C 11/1236; B60C 2011/0353; B60C 2011/1213; B60C 2011/0346; B60C 2011/0365
See application file for complete search history.

(56) References Cited

U.S. PATENT DOCUMENTS

2006/0102267 A1*  5/2006  Takahashi ........... B60C 11/0306
                                                        152/209.18
2013/0160909 A1   6/2013  Atake
(Continued)

FOREIGN PATENT DOCUMENTS

EP    2 610 080 A1    7/2013
EP    3 017 965 A1    5/2016
(Continued)

OTHER PUBLICATIONS

Machine translation for Japan 2013-189099 (Year: 2019).*
Extended European Search Report dated Jul. 21, 2017 in Patent Application No. 17156814.0.

*Primary Examiner* — Steven D Maki
(74) *Attorney, Agent, or Firm* — Oblon, McClelland, Maier & Neustadt, L.L.P.

(57) ABSTRACT

A tire includes a tread having a crown main groove and shoulder main grooves extending in the tire circumferential direction. The crown groove has crown long side portions and crown short side portions inclined in the opposite directions and alternately formed in a zigzag shape extending in the tire circumferential direction, the shoulder main grooves have shoulder long side portions and shoulder short side portions inclined in the opposite directions and alternately formed in a zigzag shape extending in the tire circumferential direction, the crown main groove and shoulder main grooves are formed such that a crown long-short ratio La/Lb is larger than a shoulder long-short ratio Lc/Ld, where La is a length of each crown long side portion, Lb is a length of each crown short side portion, Lc is a length of each shoulder long side portion, and Ld is a length of each shoulder short side portion.

20 Claims, 6 Drawing Sheets

(51) Int. Cl.
*B60C 11/04* (2006.01)
*B60C 11/03* (2006.01)
*B60C 11/13* (2006.01)

(52) U.S. Cl.
CPC ...... *B60C 11/1236* (2013.01); *B60C 11/1353* (2013.01); *B60C 2011/0325* (2013.01); *B60C 2011/0346* (2013.01); *B60C 2011/0353* (2013.01); *B60C 2011/0365* (2013.01); *B60C 2011/1213* (2013.01); *B60C 2011/1361* (2013.01)

(56) References Cited

U.S. PATENT DOCUMENTS

2015/0352903 A1* 12/2015 Ookawa .............. B60C 11/0306
152/209.18
2016/0185159 A1 6/2016 Ookawa

FOREIGN PATENT DOCUMENTS

| JP | 2013-189099 A | * | 9/2013 |
| JP | 2013-189099 A | | 9/2013 |

* cited by examiner

TIRE

CROSS-REFERENCE TO RELATED APPLICATIONS

The present application is based upon and claims the benefit of priority to Japanese Patent Application No. 2016-042414, filed Mar. 4, 2016, the entire contents of which are incorporated herein by reference.

BACKGROUND OF THE INVENTION

Field of the Invention

The present invention relates to a tire that allows wear life performance, anti-stone-biting performance and wet performance to be improved in a well-balanced manner.

Description of Background Art

Japanese Patent Laid-Open Publication No. 2013-189099 describes a method in which groove widths of tread grooves are increased to improve wet performance and prevent stone biting, for example. The entire contents of this publication are incorporated herein by reference.

SUMMARY OF THE INVENTION

According to one aspect of the present invention, a tire includes a tread having a crown main groove continuously extending in a tire circumferential direction, and multiple shoulder main grooves continuously extending in the tire circumferential direction on tire axial direction outer sides of the crown main groove, respectively. The crown main groove has crown long side portions inclined to one side in an inclination direction with respect to the tire circumferential direction and crown short side portions inclined in the opposite direction with respect to the inclination direction of the crown long side portions such that each crown short side portion has a length which is shorter than a length of each crown long side portion and that the crown long side portions and short side portions are alternately formed in a zigzag shape extending in the tire circumferential direction, the shoulder main grooves have shoulder long side portions inclined to one side in an inclination direction with respect to the tire circumferential direction and shoulder short side portions inclined in the opposite direction with respect to the inclination of the shoulder long side portions such that each shoulder short side portion has a length which is shorter than a length of each shoulder long side portion and that the shoulder long side portions and short side portions are alternately formed in a zigzag shape extending in the tire circumferential direction, and the crown main groove and shoulder main grooves are formed such that a crown long-short ratio La/Lb is larger than a shoulder long-short ratio Lc/Ld, where La is a length of each crown long side portion, Lb is a length of each crown short side portion, Lc is a length of each shoulder long side portion, and Ld is a length of each shoulder short side portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
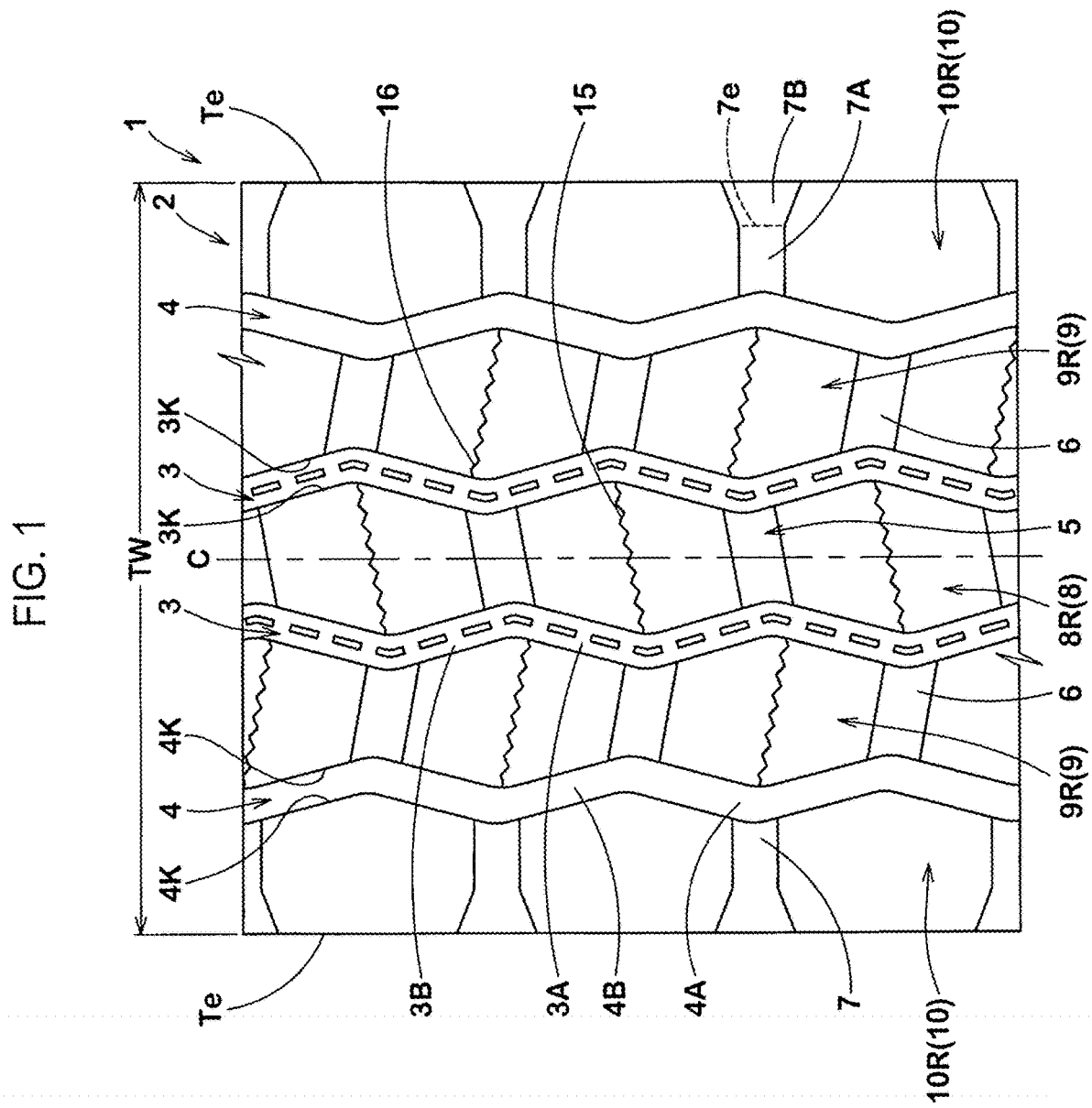
FIG. 1 is a developed view of a tread part illustrating an embodiment of the present invention.

The embodiments will now be described with reference to the accompanying drawings, wherein like reference numerals designate corresponding or identical elements throughout the various drawings.

FIG. 1 is a developed view of a tread part 2 of a tire 1 illustrating an embodiment of the present invention. The tire 1 of the present embodiment can be used, for example, for various tires such as a pneumatic tire for a passenger car or a vehicle for a heavy load, and a non-pneumatic tire that is not filled with pressurized air. The tire 1 of the present embodiment is suitably used as a pneumatic tire for a heavy load.

In the tread part 2 of the present embodiment, a pair of crown main grooves (3, 3) that respectively continuously extend in a tire circumferential direction on both outer sides of a tire equator (C) and a pair of shoulder main grooves (4, 4) that respectively continuously extend in the tire circumferential direction on tire axial direction outer sides of the crown main grooves (3, 3) are provided. The tread part 2 is not limited to such an embodiment. For example, it is also possible that only one crown main groove 3 is provided in the tread part 2.

In the present embodiment, the crown main grooves 3 and the shoulder main grooves 4 each extend in a zigzag shape in the tire circumferential direction. As a result, groove walls (3K, 4K) of the main grooves (3, 4) are inclined with respect to a traveling direction of the tire 1 and become barriers for stone biting, and thus anti-stone-biting performance is improved.

In the present embodiment, the crown main grooves 3 each include crown long side portions (3A) that are each inclined to one side with respect to the tire circumferential direction, and crown short side portions (3B) that are each inclined in a direction opposite to the inclination direction of each of the crown long side portions (3A) and each have a length shorter than that of each of the crown long side portions (3A). The shoulder main grooves 4 of the present embodiment also each include shoulder long side portions (4A) that are each inclined to one side with respect to the tire circumferential direction, and shoulder short side portions (4B) that are each inclined in a direction opposite to the inclination direction of each of the shoulder long side portions (4A) and each have a length shorter than that of each of the shoulder long side portions (4A).

Figure 2:
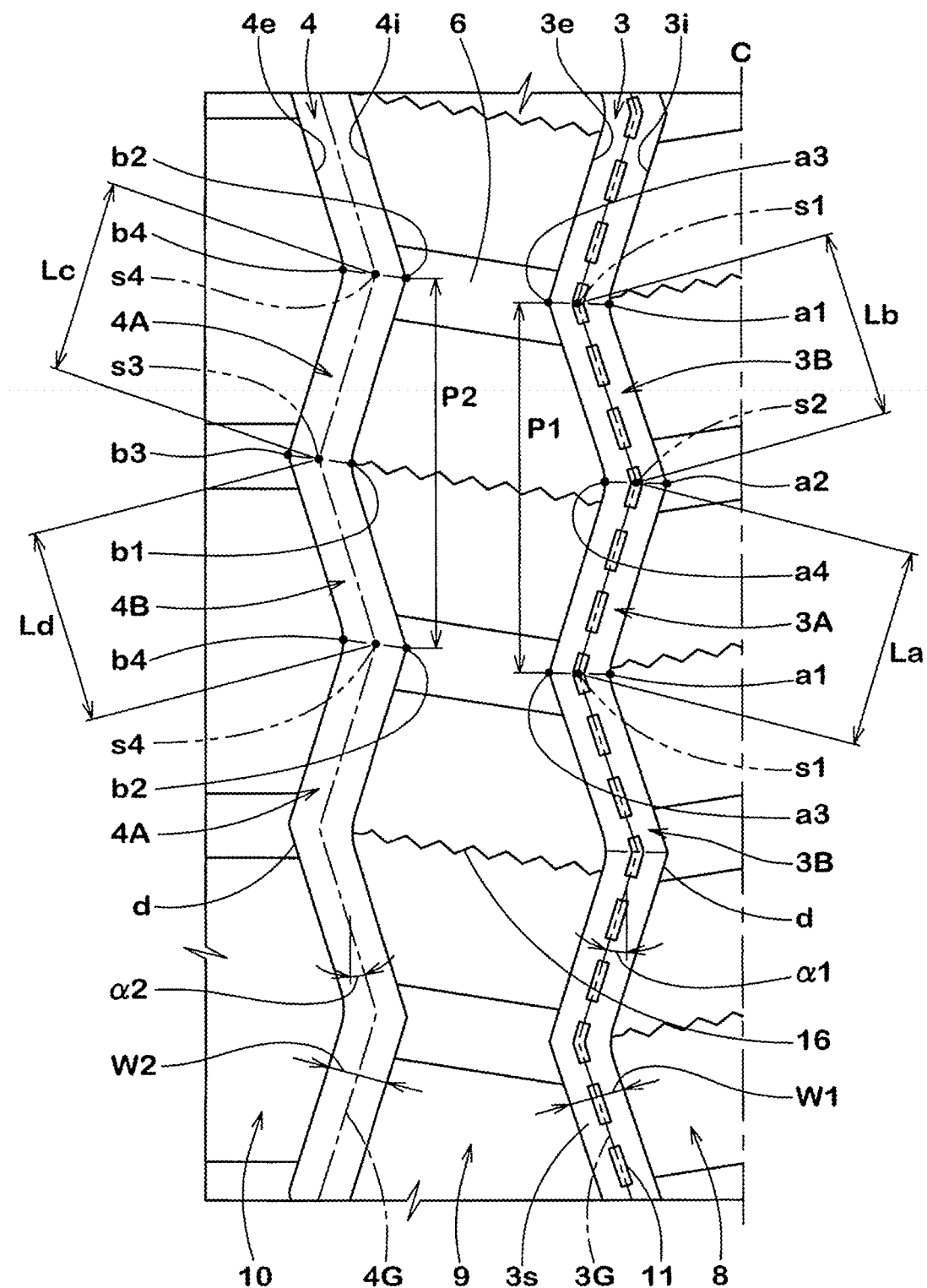
FIG. 2 is an enlarged view of a middle block row of FIG. 1.

As illustrated in FIG. 2, the crown long side portions (3A) and the crown short side portions (3B) of each crown main groove 3 are specified by a groove center line (3G) of the crown main groove 3, the groove center line (3G) being formed by connecting first midpoints (s1) and second midpoints (s2) that are alternately formed on the crown main groove 3. The first midpoints (s1) are each a midpoint of a straight line that connects a tire axial direction outermost side point (a1) of a tire axial direction inner side groove edge (3i) of the crown main groove 3 and a tire axial direction outermost side point (a3) of a tire axial direction outer side groove edge (3e) of the crown main groove 3. The second midpoints (s2) are each a midpoint of a straight line that connects a tire axial direction innermost side point (a2) of the inner side groove edge (3i) and a tire axial direction innermost side point (a4) of the outer side groove edge (3e).

Similarly, the shoulder long side portions (4A) and the shoulder short side portions (4B) of each shoulder main groove 4 are specified by a groove center line (4G) of the shoulder main groove 4, the groove center line (4G) being formed by connecting third midpoints (s3) and fourth midpoints (s4) that are alternately formed on the shoulder main groove 4. The third midpoints (s3) are each a midpoint of a straight line that connects a tire axial direction outermost side point (b1) of a tire axial direction inner side groove edge (4i) of the shoulder main groove 4 and a tire axial direction outermost side point (b3) of a tire axial direction outer side groove edge (4e) of the shoulder main groove 4. The fourth midpoints (s4) are each a midpoint of a straight line that connects a tire axial direction innermost side point (b2) of the inner side groove edge (4i) and a tire axial direction innermost side point (b4) of the outer side groove edge (4e). When any one of the points (a1-a4, b1-b4) is unclear due to, for example, a transverse groove or a lug groove, a point on a virtual groove edge (d) that smoothly extends groove edges of main grooves formed on both tire circumferential direction sides of the transverse groove or the lug groove is adopted. In the present embodiment, the point (a2), the point (a3), the point (b2) and the point (b3) are specified by virtual groove edges (d).

In the present embodiment, a crown long-short ratio (La/Lb) is specified to be larger than a shoulder long-short ratio (Lc/Ld). The crown long-short ratio (La/Lb) is a ratio of a length (La) of each of the crown long side portions (3A) to a length (Lb) of each of the crown short side portions (3B). The shoulder long-short ratio (Lc/Ld) is a ratio of a length (Lc) of each of the shoulder long side portions (4A) to a length (Ld) of each of the shoulder short side portions (4B). In this way, the crown main grooves 3 are specified to each have a relatively large crown long-short ratio (La/Lb). Therefore, a tire circumferential direction rigidity difference of land portions near the crown main grooves 3 is increased, and deformation of the land portions due to rotation of the tire becomes larger, and thus stones once caught in the crown main grooves 3 are likely to be ejected when in contact with a road surface. Further, the shoulder main grooves 4 are specified to each have a relatively small shoulder long-short ratio (Lc/Ld). Therefore, a tire circumferential direction rigidity difference of land portions adjacent to the shoulder main grooves 4 is kept small and thus slipping is suppressed. Therefore, in an embodiment of the present invention, the crown main grooves 3 where stone biting is likely to occur are formed such that stones are easily ejected, and the rigidity of the land portions near the shoulder main grooves 4 where slipping is likely to occur is increased, and thus, for example, heel-and-toe wear is largely reduced. Further, a ground contact pressure during straight traveling is smaller in the land portions near the shoulder main grooves 4 as compared to the land portions near the crown main grooves 3. Therefore, by specifying the shoulder long-short ratio (Lc/Ld) of the shoulder main grooves 4 to be relatively small, drainage resistance of the shoulder main grooves 4 is reduced and thus wet performance is improved. As a result, wear life performance, anti-stone-biting performance and wet performance are improved in a well-balanced manner.

It is desirable that the crown long-short ratio (La/Lb) be 1.17-1.27. When the crown long-short ratio (La/Lb) is less than 1.17, the tire circumferential direction rigidity difference of the land portions near the crown main grooves 3 is reduced, and deformation of the land portions becomes small, and thus, stones caught in the crown main grooves 3 are less likely to be ejected. When the crown long-short ratio (La/Lb) exceeds 1.27, the tire circumferential direction rigidity difference of the land portions becomes excessively large, and thus, for example, center wear is likely to occur, and there is a risk that the wear life performance may deteriorate.

It is desirable that the shoulder long-short ratio (Lc/Ld) be 1.01-1.11. When the shoulder long-short ratio (Lc/Ld) is less than 1.01, the tire circumferential direction rigidity difference of the land portions near the shoulder main grooves 4 becomes excessively small, and deformation of the land portions becomes small, and thus, there is a risk that stones caught in the shoulder main grooves 4 cannot be ejected. When the shoulder long-short ratio (Lc/Ld) exceeds 1.11, the tire circumferential direction rigidity difference of the land portions near the shoulder main grooves 4 becomes large, and thus, for example, heel-and-toe wear is likely to occur. Further, when the shoulder long-short ratio (Lc/Ld) exceeds 1.11, drainage resistance of the shoulder main grooves 4 becomes large, and there is a risk that the wet performance may deteriorate.

From a point of view of effectively achieving the above-described effect, it is desirable that the crown long-short ratio (La/Lb) be 1.1-1.2 times the shoulder long-short ratio (Lc/Ld). When the crown long-short ratio (La/Lb) is less than 1.1 times the shoulder long-short ratio (Lc/Ld), a difference between the rigidity difference of the land portions near the crown main grooves 3 and the rigidity difference of the land portions near the shoulder main grooves 4 becomes small, and there is a risk that stones caught in the crown main grooves 3 cannot be effectively ejected. Further, when the crown long-short ratio (La/Lb) is less than 1.1 times the shoulder long-short ratio (Lc/Ld), there is a risk that slipping of the land portions near the shoulder main grooves 4 cannot be suppressed. When the crown long-short ratio (La/Lb) exceeds 1.2 times the shoulder long-short ratio (Lc/Ld), the rigidity difference of the land portions near the crown main grooves 3 becomes excessively large, and there is a risk that the wear life performance may deteriorate.

The crown long side portions (3A), the crown short side portions (3B), the shoulder long side portions (4A) and the shoulder short side portions (4B) are each formed in a straight line shape. As a result, rigidity in the vicinity of each of the main grooves (3, 4) is maintained high, and thus, excellent wear life performance is achieved.

In order for such an effect to be effectively achieved, it is desirable that one pitch (P1) of the zigzag shape of each of the crown main grooves 3 and one pitch (P2) of the zigzag shape of each of the shoulder main grooves 4 be each 28%-36% of a tread width (TW) (illustrated in FIG. 1).

The "tread width (TW)" is defined as a tire axial direction distance between tread edges (Te, Te) that are respectively ground contact positions of both tire axial direction outermost sides when the tire 1 in a normal state, which refers to a no-load state in which the tire 1 is mounted to a normal rim and is filled with air at a normal internal pressure, is loaded with a normal load and is grounded on a flat surface at a camber angle of 0 degree. Unless otherwise specified, values of dimensions and the like of the parts of the tire are values measured in the normal state.

The term "normal rim" refers to a rim for which standards are set for each tire in a system of standards that includes standards on which the tire is based. For example, the term "normal rim" refers to a "Standard Rim" in the JATMA standards, a "Design Rim" in the TRA standards, or a "Measuring Rim" in the ETRTO standards. The term "normal internal pressure" refers to an air pressure for which standards are set for each tire in a system of standards that includes the standards on which the tire is based, and refers to a "Highest Air Pressure" in the JATMA standards, a maximum value published in the table "Tire Load Limits at Various Cold Inflation Pressures" in the TRA standards, or an "Inflation Pressure" in the ETRTO standards.

The term "normal load" refers to a load for which standards are set for each tire in a system of standards that includes the standards on which the tire is based, and refers to a "Maximum Load Capacity" in the JATMA standards, a maximum value published in the table "Tire Load Limits at Various Cold Inflation Pressures" in the TRA standards, or a "Load Capacity" in the ETRTO standards.

In each of the crown main grooves 3 of the present embodiment, block-like protruding portions 11 are formed on a groove bottom (3s). The protruding portions 11 can reduce damage to the groove bottom (3s) due to stone biting. In the present embodiment, the protruding portions 11 are provided along the groove center line (3G).

It is desirable that an angle ($\alpha 1$) of the crown main grooves 3 with respect to the tire circumferential direction be 10-30 degrees. That is, when the angle ($\alpha 1$) of the crown main grooves 3 is less than 10 degrees, the groove walls (3k) of the crown main grooves 3 cannot suppress stone biting, and there is a risk that the anti-stone-biting performance may deteriorate. When the angle ($\alpha 1$) of the crown main grooves 3 exceeds 30 degrees, the tire circumferential direction rigidity of the land portions near the crown main grooves 3 is excessively reduced, and thus, there is a risk that the wear life performance may deteriorate.

It is desirable that an angle ($\alpha 2$) of the shoulder main grooves 4 with respect to the tire circumferential direction be smaller than the angle ($\alpha 1$) of the crown main grooves 3 (illustrated in FIG. 2). As a result, the tire circumferential direction rigidity of the land portions near the shoulder main grooves 4 is increased and thus the heel-and-toe wear is further suppressed. From this point of view, it is desirable that the angle ($\alpha 2$) of the shoulder main grooves 4 be 8-28 degrees. The angles ($\alpha 1$, $\alpha 2$) are respectively angles of the groove center lines (3G, 4G) of the main grooves (3, 4).

It is desirable that a groove width (W1) of the crown main grooves 3 be smaller than a groove width (W2) of the shoulder main grooves 4. When the groove width (W1) of the crown main grooves 3 is larger than the groove width (W2) of the shoulder main grooves 4, there is a risk that, during straight traveling, rigidity of land portions between the crown main grooves (3, 3), where the ground contact pressure is high, is insufficient, and the wear life performance deteriorates. When the groove width (W1) of the crown main grooves 3 is excessively smaller than the groove width (W2) of the shoulder main grooves 4, there is a risk that the anti-stone-biting performance may deteriorate. From this point of view, it is desirable that the groove width (W1) of the crown main grooves 3 be 85%-95% of the groove width (W2) of the shoulder main grooves 4. Although not particularly limited, it is desirable that a groove depth (not illustrated in the drawings) of each of the crown main grooves 3 and the shoulder main grooves 4 be 10-20 mm.

As illustrated in FIG. 1, in the tread part 2 of the present embodiment, crown transverse grooves 5, middle transverse grooves 6 and shoulder transverse grooves 7 are provided. In the present embodiment, the crown transverse grooves 5 extend between the crown main grooves (3, 3). In the present embodiment, the middle transverse grooves 6 extend between the crown main grooves 3 and the shoulder main grooves 4. In the present embodiment, the shoulder transverse grooves 7 extend between the shoulder main grooves 4 and the tread edges (Te).

As a result, in the tread part 2, a crown block row (8R), middle block rows (9R), and shoulder block rows (10R) are formed. The crown block row (8R) is a land portion in which multiple crown blocks 8, which are divided by the pair of crown main grooves (3, 3) and the crown transverse grooves 5, are arranged in the tire circumferential direction. The middle block rows (9R) are land portions in which multiple middle blocks 9, which are divided by the crown main grooves 3, the shoulder main grooves 4 and the middle transverse grooves 6, are arranged in the tire circumferential direction. The shoulder block rows (10R) are land portions in which multiple shoulder blocks 10, which are divided by the tread edges (Te), the shoulder main grooves 4 and the shoulder transverse grooves 7, are arranged in the tire circumferential direction.

Figure 3:
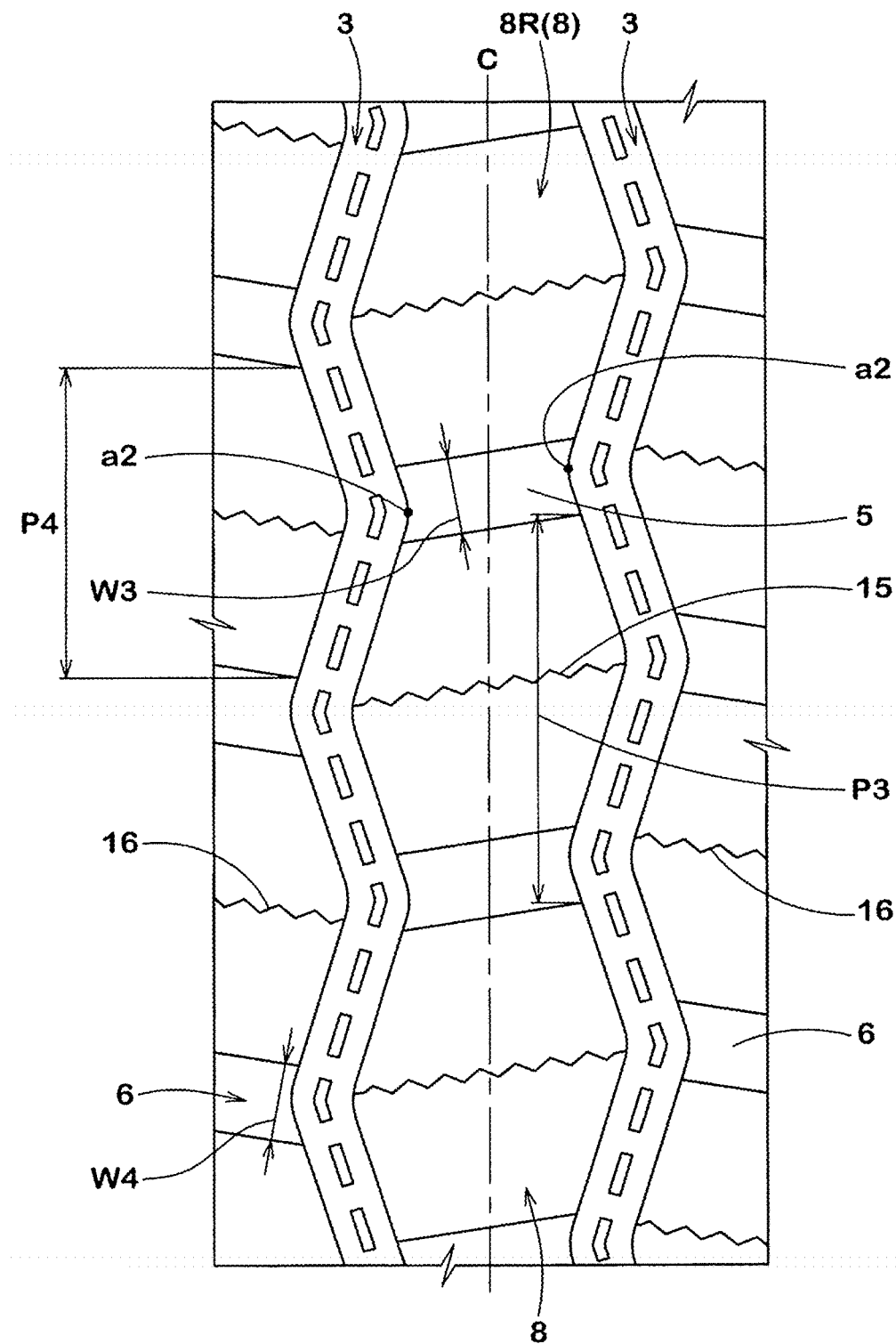
FIG. 3 is an enlarged view of a crown block row of FIG. 1.

As illustrated in FIG. 3, the crown transverse grooves 5 of the present embodiment are formed such that both ends of each of the crown transverse grooves 5 include the points ($\alpha 2$). That is, the crown transverse grooves 5 are formed to each have a small length in the tire axial direction. Such crown transverse grooves 5 can improve anti-stone-biting performance, and allow rigidity of the crown blocks 8 to be maintained high and can suppress wear occurring to the crown blocks 8.

As illustrated in FIG. 2, the middle transverse grooves 6 of the present embodiment are each formed to include the point (a3) on a tire axial direction inner side and the point (b2) on a tire axial direction outer side. That is, the middle transverse grooves 6 are also formed to each have a small length in the tire axial direction. As a result, anti-stone-biting performance is improved, and rigidity of the middle blocks 9 can be maintained high and occurrence of wear can be suppressed.

The crown transverse grooves 5 and the middle transverse grooves 6 each extend linearly. As a result, the rigidity of the middle blocks 9 and the crown blocks 8 is maintained high and thus the wear life performance is further improved. It is also possible that the middle transverse grooves 6 and the crown transverse grooves 5 are each formed, for example, to have an arc-shaped groove edge.

Figure 4:
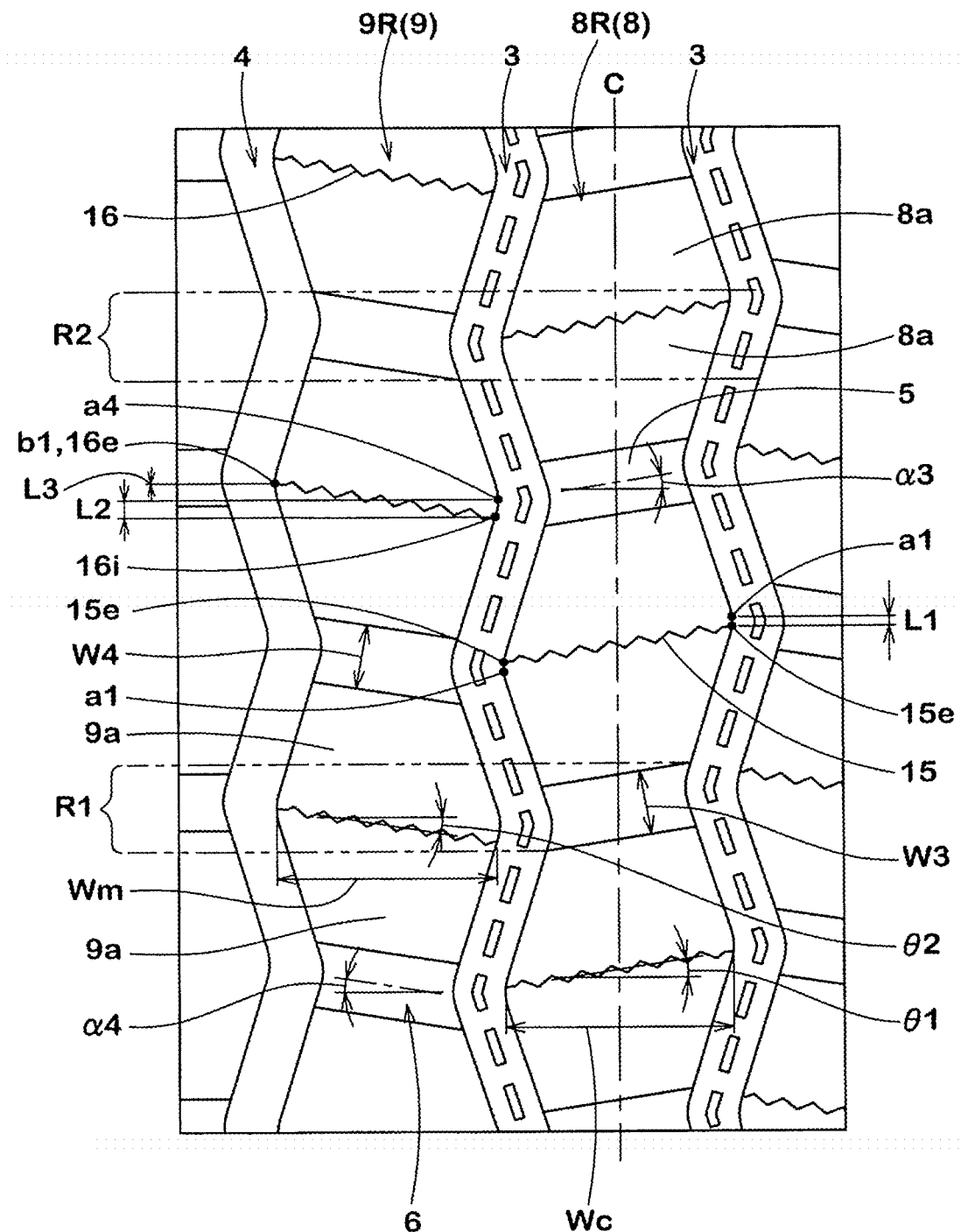
FIG. 4 is an enlarged view of the crown block row and the middle block row.

As illustrated in FIG. 4, the crown transverse grooves 5 and the middle transverse grooves 6 are inclined. As a result, tire circumferential direction rigidity of the crown blocks 8 and the middle blocks 9 is effectively reduced and deformation due to rotation of the tire 1 is facilitated. Therefore, stones caught in the crown transverse grooves 5 and the middle transverse grooves 6 can be easily ejected. When the inclination of the crown transverse grooves 5 and the middle transverse grooves 6 is large, the tire circumferential direction rigidity of the crown blocks 8 and the middle blocks 9 becomes excessively small, and there is a risk that the wear life performance may deteriorate. Therefore, it is desirable that an angle ($\alpha 3$) of the crown transverse grooves 5 with respect to the tire axial direction and an angle ($\alpha 4$) of the middle transverse grooves 6 with respect to the tire axial direction be each 5-15 degrees.

The middle transverse grooves 6 are inclined in an opposite direction to the crown transverse grooves 5. In the present embodiment, the middle transverse grooves 6 arc inclined leftward and upward, and the crown transverse grooves 5 are inclined rightward and upward. As a result, opposite forces with respect to the tire axial direction due to the crown transverse grooves 5 and the middle transverse grooves 6 cancel each other out, and thus, uneven wear is suppressed. Therefore, the wear life performance is maintained high.

It is desirable that a groove width (W4) of the middle transverse grooves 6 be larger than a groove width (W3) of the crown transverse grooves 5. As a result, during straight traveling, the rigidity of the crown blocks 8, on which a large ground contact pressure acts, can be maintained high and thus the wear life performance is maintained. In order to improve the wear life performance and the anti-stone-biting performance in a well-balanced manner, it is desirable that the groove width (W3) of the crown transverse grooves 5 be 15% or more and less than 25% of one pitch (P3) (illustrated in FIG. 3) of the crown transverse grooves 5. It is desirable that the groove width (W4) (illustrated in FIG. 3) of the middle transverse grooves 6 be more than 15% and equal to or less than 25% of one pitch (P4) of the middle transverse grooves 6. It is desirable that the crown transverse grooves 5 and the middle transverse grooves 6 each have a groove depth (not illustrated in the drawings) of, for example, 8-16 mm.

As illustrated in FIG. 1, the shoulder transverse grooves 7 of the present embodiment each include a constant width portion (7A) and a gradually increasing portion (7B). The constant width portion (7A) extends from one of the shoulder main grooves 4 to a tire axial direction outer side and has a constant groove width. The gradually increasing portion (7B) connects a tire axial direction outer end (7e) of the constant width portion (7A) and one of the tread edges (Te) and has a groove width that gradually increases toward a tire axial direction outer side.

In the present embodiment, a groove depth (not illustrated in the drawings) of each of the shoulder transverse grooves 7 is 10%-40% of the groove depth of each of the shoulder main grooves 4. Such shoulder transverse grooves 7 can increase rigidity of the shoulder block row (10R), on which a large lateral force acts during turning, and suppress heel-and-toe wear.

In the present embodiment, the crown blocks 8 and the middle blocks 9 are each formed in a hexagonal shape having a large barrel-like tire circumferential direction central portion. Such crown blocks 8 and middle blocks 9 ensure high rigidity of the tire circumferential direction central portions. Therefore, deformation of the blocks (8, 9) in the tire axial direction is suppressed and thus the wear life performance is improved.

As illustrated in FIG. 4, in the present embodiment, a tire axial direction maximum width (We) of the crown blocks 8 is larger than a tire axial direction maximum width (Wm) of the middle blocks 9. As a result, during straight traveling, the rigidity of the crown blocks 8, on which a large ground contact pressure acts, can be maintained high and thus the wear life performance is improved. When the tire axial direction maximum width (We) of the crown blocks 8 is excessively larger than the tire axial direction maximum width (Wm) of the middle blocks 9, the rigidity of the middle blocks 9 becomes small, and there is a risk that the wear life performance may deteriorate. Further, the rigidity of the crown blocks 8 becomes excessively large, deformation of the crown blocks 8 is largely suppressed, and there is a risk that the anti-stone-biting perfoiinance may deteriorate. From this point of view, it is desirable that the tire axial direction maximum width (We) of the crown blocks 8 be more than 1.00 times and equal to or less than 1.05 times the tire axial direction maximum width (Wm) of the middle blocks 9.

In order for such an effect to be effectively achieved, it is desirable that the maximum width (Wc) of the crown blocks 8 be 15%-25% of the tread width (TW).

Crown sipes 15 and middle sipes 16 extending in the tire axial direction are respectively provided in the crown blocks 8 and the middle blocks 9. Such crown sipes 15 and middle sipes 16 promote deformation of the blocks (8, 9) and improve the anti-stone-biting performance.

The crown sipes 15 and the middle sipes 16 respectively extend across the blocks (8, 9) in the tire axial direction. As a result, in each of the crown blocks 8, crown block pieces (8a, 8a) in a pair are respectively formed on both tire circumferential direction sides of the crown sipe 15. In each of the middle blocks 9, middle block pieces (9a, 9a) in a pair are respectively formed on both tire circumferential direction sides of the middle sipe 16. When each of the sipes (15, 16) is in contact with a road surface, the block pieces on both sides of the sipe support each other. Therefore, the rigidity of each of the blocks (8, 9) is maintained high and thus, deterioration in the wear life performance is suppressed.

The crown sipes 15 and the middle sipes 16 are respectively provided in tire maximum width position vicinities of the blocks (8, 9). As a result, the blocks (8, 9) effectively default, and the anti-stone-biting performance is improved. In the case of the crown blocks 8, that "the sipes are provided in tire maximum width position vicinities" means that a tire circumferential direction distance (L1) between a point (α1) and an outer end (15e) of a crown sipe 15 adjacent to the point (α1) is 40% or less of the groove width (W3) of the crown transverse grooves 5. Further, in the case of the middle blocks 9, that "the sipes are provided in tire maximum width position vicinities" means that a tire circumferential direction distance (L2) between a point (a4) and an inner end (16i) of a middle sipe 16 adjacent to the point (a4) is 40% or less of the groove width (W4) of the middle transverse grooves 6. In addition, it also means that a tire circumferential direction distance (L3) between a point (b1) and an outer end (16e) of a middle sipe 16 adjacent to the point (b1) is 40% or less of the groove width (W4) of the middle transverse grooves 6.

At least a portion of each of the middle sipes 16 extends in a first region (R1) formed by projecting an adjacent crown transverse groove 5 on a tire axial direction outer side of the crown transverse groove 5. As a result, positions at which the rigidities of the middle block row (9R) and the crown block row (8R) are reduced are aligned in the tire circumferential direction. Therefore, deformation of the middle block pieces (9a, 9a) is facilitated and thus the anti-stone-biting performance is further improved. In the present embodiment, the entire length of each of the middle sipes 16 overlaps with the first region (R1) and thus, the above-described effect is effectively achieved.

From the same point of view, it is desirable that each of the crown sipes 15 of the present embodiment, over its entire length, extend in a second region (R2) formed by projecting an adjacent middle transverse groove 6 on a tire axial direction inner side of the middle transverse groove 6.

It is desirable that angles (θ1, θ2) of the crown sipes 15 and the middle sipes 16 with respect to the tire axial direction be each 5 degrees or more and less than 15 degrees. Such crown sipes 15 and middle sipes 16 suppress decrease in tire axial direction rigidity of the block pieces (8a, 9a), and help the crown block pieces (8a, 8a) and the middle block pieces (9a, 9a) to support each other when in contact with a road surface. Therefore, excessive deformation of the block pieces (8a, 9a) is suppressed, and the wear life performance is effectively improved.

In order for the rigidity of the block pieces (8a, 9a) to be maintained high, it is desirable that the angle (θ1) of the crown sipes 15 be the same as the angle (α3) of the crown transverse grooves 5. It is desirable that the angle (θ2) of the middle sipes 16 be the same as the angle (α4) of the middle transverse grooves 6.

In the present embodiment, the crown sipes 15 and the middle sipes 16 each extend in a zigzag shape. As a result, excessive deformation of the crown blocks 8 and the middle blocks 9 is suppressed and thus the wear life performance is maintained high. The crown sipes 15 and the middle sipes 16 are not limited to having such a shape. For example, the sipes may also each extend in a linear or wavy shape.

Figure 5:
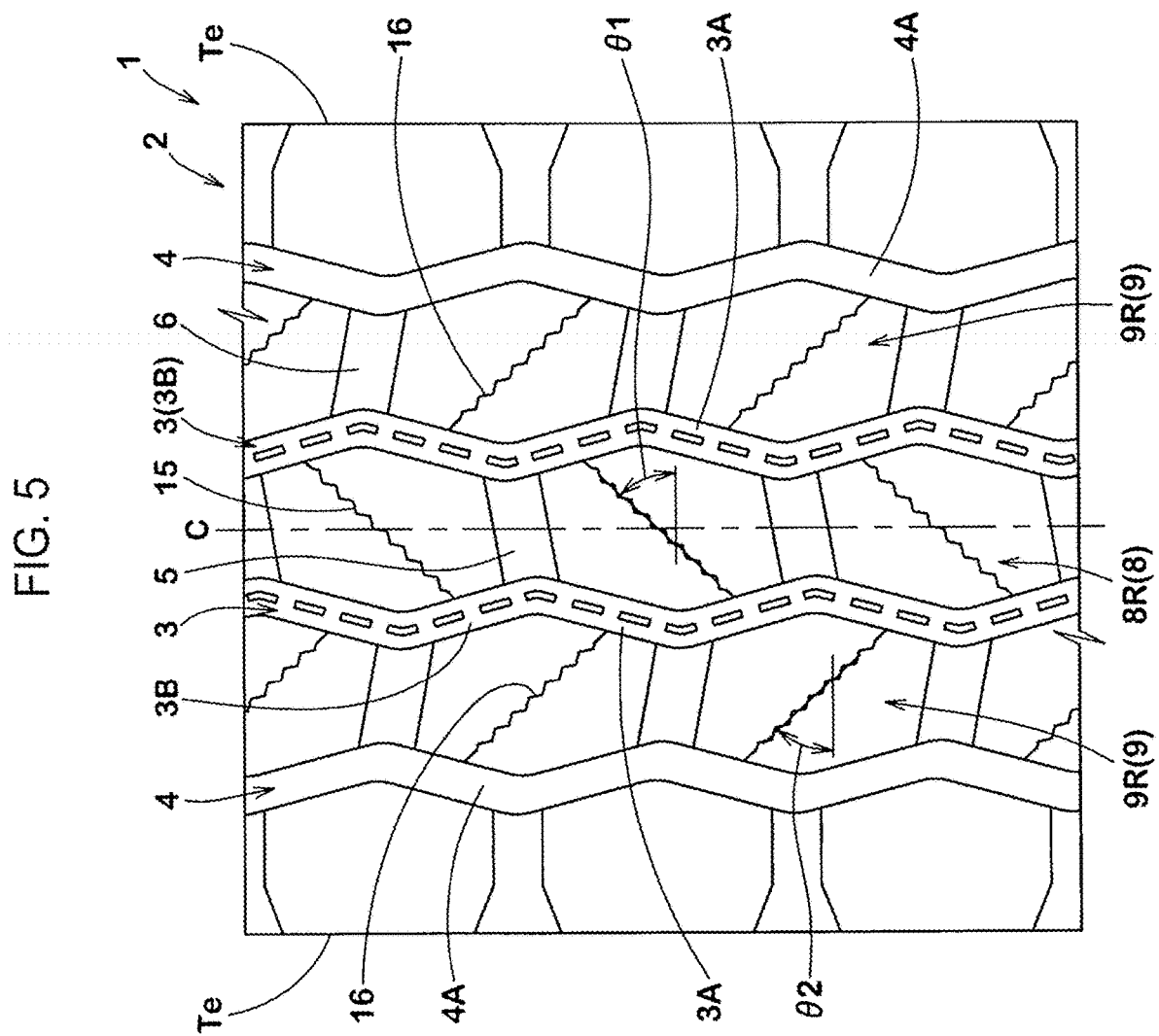
FIG. 5 is a developed view of a tread part illustrating another embodiment of the present invention.

FIG. 5 is a developed view of a tread part 2 illustrating another embodiment of the present invention. In this embodiment, a tread pattern is the same as that illustrated in FIG. 1 except for the shape of the crown sipes 15 and the middle sipes 16. Therefore, description about structures other than the crown sipes 15 and the middle sipes 16 is omitted. In this embodiment, the tire axial direction angles (θ1, θ2) of the crown sipes 15 and the middle sipes 16 are each 15-75 degrees. Such crown sipes 15 and middle sipes 16 allow a large edge effect in the tire circumferential direction to be achieved and allow a water film between the crown blocks 8 and middle blocks 9 and a tread surface to be effectively discharged. When the angles (θ1, θ2) of the crown sipes 15 and the middle sipes 16 are large, the rigidity of the crown blocks 8 and the middle blocks 9 is largely decreased. When the angles (θ1, θ2) of the crown sipes 15 and the middle sipes 16 are small, improvement in the wet performance is reduced. From this point of view, the angles (θ1, θ2) of the crown sipes 15 and the middle sipes 16 with respect to the tire axial direction are more preferably 35-55 degrees.

Further, in the present embodiment, the crown sipes 15 each extend between crown short side portions (3B, 3B). As a result, the rigidity of the crown blocks 8, where a large ground contact pressure acts, can be effectively decreased and thus, deformation of the crown blocks 8 near the crown short side portions (3B) is facilitated and the anti-stone-biting performance is improved.

In the present embodiment, the middle sipes 16 each extend between a crown long side portion (3A) and a shoulder long side portion (4A). That is, tire axial direction inner ends (16i) of the middle sipes 16 and outer ends (15e) of the crown sipes 15 are largely separated in the tire circumferential direction, and thus, excessive deformation of the blocks (8, 9) is suppressed. As a result, deterioration of the wear life performance is suppressed. In this way, in this embodiment, while high wet performance is achieved, the wear life performance and the anti-stone-biting performance are improved in a well-balanced manner.

In the above, embodiments of the present invention are described in detail. However, the present invention is not limited to the illustrated embodiments and can be embodied in various modified modes.

EXAMPLES

Heavy duty pneumatic tires of a size 275/80R22.5 having the tread pattern of FIG. 1 are prototyped based on specifications shown in Table 1, and wet performance, anti-stone-biting performance and wear life performance of each of the prototyped tires are tested. A test method is as follows.
  Groove depth of the main grooves: 16.5 mm
  Groove depth of the crown transverse grooves and the middle transverse grooves: 12.5 mm
  Groove depth of the shoulder transverse grooves: 4.0 mm
  Tread width (TW): 231.9 mm
  Maximum width (Wc)/(TW) of the crown blocks: 20%
  One pitch (P1)/(TW) of the crown main grooves: 32%
  One pitch (P2)/(TW) of the shoulder main grooves: 32%
Stone Biting Resistance The prototyped tires are mounted to all wheels of a vehicle under the following conditions, and are caused to travel on a circuit course of a gravel road surface for 2000 km at a speed of 40-60 km/h. Thereafter, a total number of stones caught in the crown main grooves and the shoulder main grooves is examined. The result is expressed as an index number with a value of Comparative Example 1 as 100. A smaller index number indicates a better anti-stone-biting performance.
  Rim: 7.50×22.5
  Internal Pressure: 900 kPa
  Vehicle: 10-ton dump truck (no load)
Wear Life Performance After the above test, the prototyped tires are further caused to travel on the same test course for 5000 km, and then, an average of groove depths at eight places on a tire circumference in each of the crown main grooves and shoulder main grooves is calculated, and the result is expressed as an index number with a value of Comparative Example 1 as 100. A larger index number indicates a better wear life performance.
Wet Performance A test driver drives the above vehicle on a test course of a wet road surface with a water depth of 1 mm, and driving characteristics relating to a driving force and a braking force at the time of driving are evaluated based on a sensory evaluation by the test driver. The result is expressed as a score with a value of Comparative Example 1 as 100. A larger score indicates a better wet performance.

The test results are shown in Table 1.

TABLE 1

|  | Comparative Example 1 | Comparative Example 2 | Comparative Example 3 | Example 1 | Example 2 | Example 3 | Example 4 | Example 5 | Example 6 |
| --- | --- | --- | --- | --- | --- | --- | --- | --- | --- |
| Figure showing shape of tread part | FIG. 1 | FIG. 1 | FIG. 1 | FIG. 1 | FIG. 1 | FIG. 1 | FIG. 1 | FIG. 1 | FIG. 1 |
| Crown long-short ratio | 1.0 | 1.22 | 1.06 | 1.22 | 1.15 | 1.17 | 1.27 | 1.30 | 1.22 |
| Shoulder long-short ratio | 1.0 | 1.22 | 1.06 | 1.06 | 1.06 | 1.06 | 1.06 | 1.06 | 1.0 |
| (Crown long-short ratio)/(Shoulder long-short ratio) | 1.0 | 1.0 | 1.0 | 1.15 | 1.08 | 1.10 | 1.20 | 1.23 | 1.22 |
| (Crown block maximum width)/(Shoulder block maximum width) | 1.03 | 1.03 | 1.03 | 1.03 | 1.03 | 1.03 | 1.03 | 1.03 | 1.03 |

TABLE 1-continued

|  | | | | | | | | | |
| --- | --- | --- | --- | --- | --- | --- | --- | --- | --- |
| Crown sipe and middle sipe angles (α1, α2) (degrees) | 10 | 10 | 10 | 10 | 10 | 10 | 10 | 10 | 10 |
| Anti-stone-biting performance [Index number: a larger value is better] | 100 | 106 | 102 | 110 | 107 | 108 | 112 | 112 | 108 |
| Wear life performance [Index number: a larger value is better] | 100 | 95 | 106 | 110 | 108 | 110 | 108 | 106 | 107 |
| Wet performance [Score: a larger value is better] | 100 | 100 | 100 | 110 | 107 | 108 | 107 | 105 | 104 |

Figure 6:
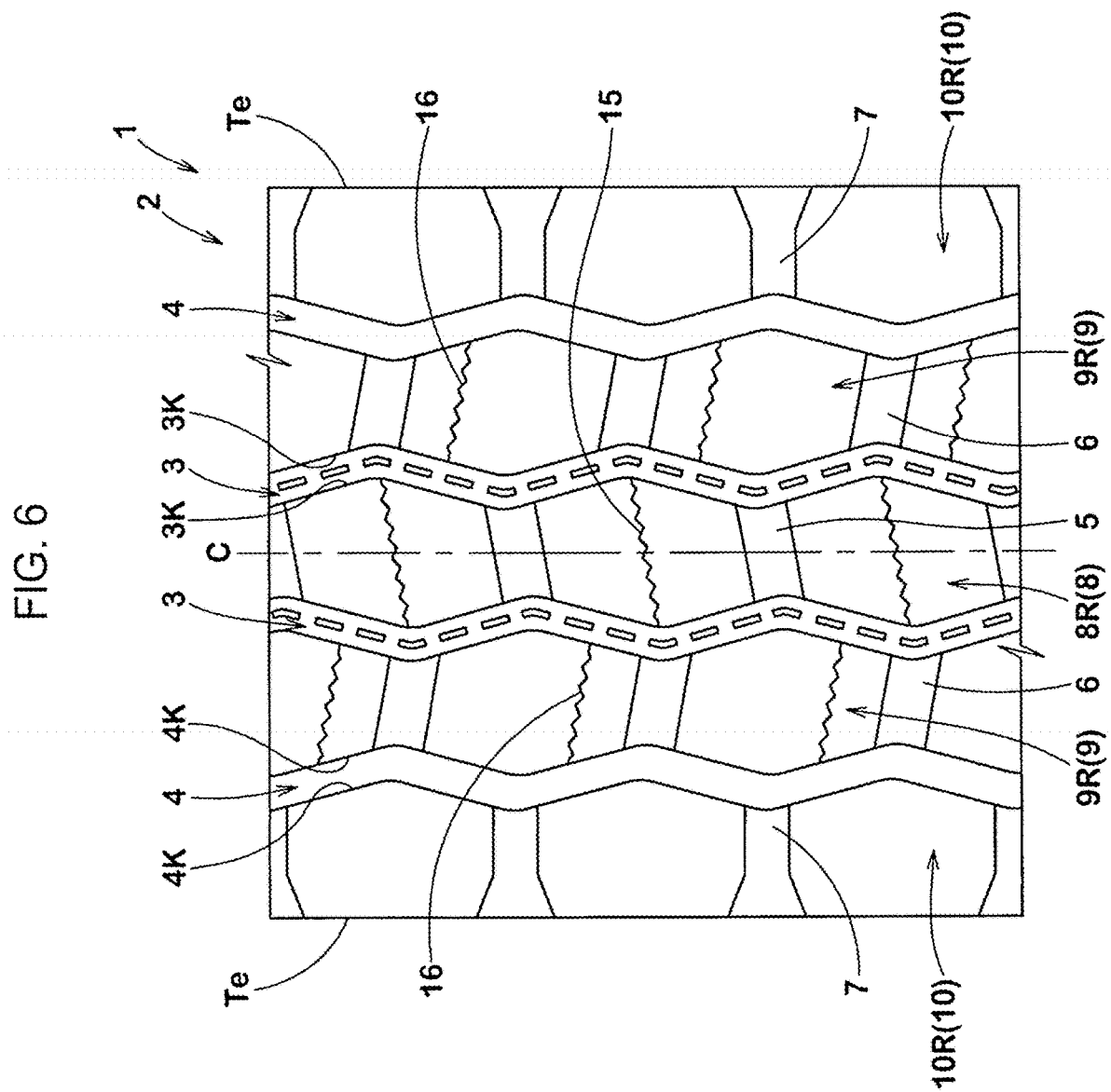
FIG. 6 is a developed view of a tread part illustrating yet another embodiment of the present invention.

|  | Example 7 | Example 8 | Example 9 | Example 10 | Example 11 | Example 12 | Example 13 | Example 14 | Example 15 |
| --- | --- | --- | --- | --- | --- | --- | --- | --- | --- |
| Figure showing shape of tread part | FIG. 1 | FIG. 1 | FIG. 1 | FIG. 1 | FIG. 1 | FIG. 1 | FIG. 1 | FIG. 5 | FIG. 6 |
| Crown long-short ratio | 1.22 | 1.22 | 1.22 | 1.22 | 1.22 | 1.22 | 1.22 | 1.22 | 1.22 |
| Shoulder long-short ratio | 1.01 | 1.11 | 1.13 | 1.06 | 1.06 | 1.06 | 1.06 | 1.06 | 1.06 |
| (Crown long-short ratio)/(Shoulder long-short ratio) | 1.21 | 1.10 | 1.08 | 1.15 | 1.15 | 1.15 | 1.15 | 1.15 | 1.15 |
| (Crown block maximum width)/(Shoulder block maximum width) | 1.03 | 1.03 | 1.03 | 1.00 | 1.01 | 1.05 | 1.07 | 1.03 | 1.03 |
| Crown sipe and middle sipe angles (α1, α2) (degrees) | 10 | 10 | 10 | 10 | 10 | 10 | 10 | 45 | 10 |
| Anti-stone-biting performance [Index number: a larger value is better] | 110 | 108 | 106 | 108 | 110 | 110 | 108 | 111 | 107 |
| Wear life performance [Index number: a larger value is better] | 108 | 112 | 112 | 108 | 110 | 110 | 108 | 103 | 110 |
| Wet performance [Score: a larger value is better] | 105 | 107 | 105 | 106 | 107 | 108 | 106 | 116 | 108 |

As is apparent from Table 1, it can be confirmed that the pneumatic tires of the examples allow the wet performance, the anti-stone-biting performance and the wear life performance to be significantly improved as compared to the comparative examples. Further, tires of different tread patterns or tire sizes are tested and the results showed the same trend as the present test results.

In a tire that, in addition to traveling on a paved road surface, often travels on an unpaved road surface such as a gravel road on which gravel stones are present, in order to ensure traction, a block pattern is adopted in which a tread part is divided into multiple blocks by tread grooves including main grooves extending in a tire circumferential direction and transverse grooves extending in directions intersecting the main grooves. When traveling on such an unpaved road surface, so-called stone biting, in which pebbles or gravel stones are caught in the grooves of the tread part, is likely to occur. In particular, in main grooves near a tire equator where a large ground contact pressure acts, stone biting is likely to occur. When traveling in the stone biting state, there is a risk that groove bottoms may be damaged by gravel stones and the like and thus the tire may be damaged. Further, for such a tire, high wet performance is demanded.

In order to improve wet performance and prevent stone biting, for example, groove widths of tread grooves may be increased. However, in this method, rigidity of the tread part is decreased and thus there is a problem that wear life of the tire deteriorates. In particular, in land portions on tire axial direction outer sides where the tire has a smaller outer diameter than that at the tire equator, slipping of the land portions increases and thus, for example, heel-and-toe wear tends to worsen.

A tire according to an embodiment of the present invention improves wear life performance, anti-stone-biting performance and wet performance in a well-balanced manner based on improving crown main grooves and shoulder main grooves.

A tire according to an embodiment of the present invention includes a tread part in which crown main grooves that each continuously extend in a tire circumferential direction and shoulder main grooves that respectively continuously extend in the tire circumferential direction on tire axial direction outer sides of the crown main grooves are provided. The crown main grooves are each formed in a zigzag shape in which crown long side portions that are each inclined to one side with respect to the tire circumferential direction and crown short side portions that are each inclined in a direction opposite to the inclination direction of each of the crown long side portions and each have a length shorter than that of each of the crown long side portions are alternately formed in the tire circumferential direction. The shoulder main grooves are each formed in a zigzag shape in which shoulder long side portions that are each inclined to one side with respect to the tire circumferential direction and shoulder short side portions that are each inclined to a direction opposite to the inclination direction of each of the shoulder long side portions and each have a length shorter than that of each of the shoulder long side portions are alternately formed in the tire circumferential direction. A crown long-short ratio (La/Lb), which is a ratio of a length (La) of each of the crown long side portions to a length (Lb) of each of the crown short side portions, is larger than a shoulder long-short ratio (Lc/Ld), which is a ratio of a length (Lc) of each of the shoulder long side portions to a length (Ld) of each of the shoulder short side portions.

In a tire according to an embodiment of the present invention, it is desirable that the crown long-short ratio (La/Lb) be 1.17-1.27, and the shoulder long-short ratio (Lc/Ld) be 1.01-1.11.

In a tire according to an embodiment of the present invention, it is desirable that the crown long-short ratio (La/Lb) be 1.1-1.2 times the shoulder long-short ratio (Lc/Ld).

In a tire according to an embodiment of the present invention, it is desirable that the crown main grooves be respectively provided on two outer sides of a tire equator.

In a tire according to an embodiment of the present invention, it is desirable that, by providing, in the tread part, multiple crown transverse grooves that extend between the crown main grooves and multiple middle transverse grooves that extend between each of the crown main grooves and an adjacent shoulder main groove, middle blocks that are divided by the crown main grooves, the shoulder main grooves and the middle transverse grooves be formed; middle sipes extending in the tire axial direction be respectively provided in the middle blocks; and at least a portion of each of the middle sipes extend in a region formed by projecting an adjacent crown transverse groove on a tire axial direction outer side.

In a tire according to an embodiment of the present invention, it is desirable that the crown main grooves be respectively provided on both outer sides of the tire equator; by providing, in the tread part, multiple crown transverse grooves that extend between the crown main grooves and multiple middle transverse grooves that extend between each of the crown main grooves and an adjacent shoulder main groove, middle blocks that are divided by the crown main grooves, the shoulder main grooves and the middle transverse grooves, and crown blocks that are divided by a pair of the crown main grooves and the crown transverse grooves, be formed; and a tire axial direction maximum width of each of the crown blocks be more than 1.00 times and 1.05 or less times a tire axial direction maximum width of each of the middle blocks.

In a tire according to an embodiment of the present invention, it is desirable that the tire axial direction maximum width of each of the crown blocks be 15%-25% of a tread width.

In a tire according to an embodiment of the present invention, it is desirable that a groove width of each of the middle transverse grooves be larger than a groove width of each of the crown transverse grooves.

In a tire according to an embodiment of the present invention, it is desirable that the groove width of each of the crown transverse grooves be 15% or more and 25% or less of one pitch of the crown transverse grooves, and the groove width of each of the middle transverse grooves be more than 15% and equal to or less than 25% of one pitch of the middle transverse grooves.

In a tire according to an embodiment of the present invention, it is desirable that the crown main grooves be respectively provided on both outer sides of the tire equator; by providing, in the tread part, multiple crown transverse grooves that extend between the crown main grooves and multiple middle transverse grooves that extend between each of the crown main grooves and an adjacent shoulder main groove, middle blocks that are divided by the crown main grooves, the shoulder main grooves and the middle transverse grooves, and crown blocks that are divided by a pair of the crown main grooves and the crown transverse grooves, be formed; crown sipes that respectively extend across the crown blocks be respectively provided in the crown blocks; middle sipes that respectively extend across the middle blocks be respectively provided in the middle blocks; and an angle of each of the crown sipes and the middle sipes with respect to the tire axial direction be 15-75 degrees.

In a tire according to an embodiment of the present invention, in the tread part, the crown main grooves that each continuously extend in the tire circumferential direction and the shoulder main grooves that respectively continuously extend in the tire circumferential direction on the tire axial direction outer sides of the crown main grooves are provided. The crown main grooves are each formed in a zigzag shape in which the crown long side portions that are each inclined to one side with respect to the tire circumferential direction and the crown short side portions that are each inclined in a direction opposite to the inclination direction of each of the crown long side portions and each have a length shorter than that of each of the crown long side portions are alternately formed in the tire circumferential direction. The shoulder main grooves are each formed in a zigzag shape in which the shoulder long side portions that are each inclined to one side with respect to the tire circumferential direction and the shoulder short side portions that are each inclined in a direction opposite to the inclination direction of each of the shoulder long side portions and each have a length shorter than that of each of the shoulder long side portions are alternately formed in the tire circumferential direction. As a result, groove walls of the zigzag-shaped crown main grooves and shoulder main grooves are inclined with respect to a traveling direction of the tire and become barriers for stone biting. Therefore, anti-stone-biting performance is improved.

Further, the crown long-short ratio (La/Lb), which is the ratio of the length (La) of each of the crown long side portions (3A) to the length (Lb) of each of the crown short side portions (3B), is larger than the shoulder long-short ratio (Lc/Ld), which is the ratio of the length (Lc) of each of the shoulder long side portions (4A) to the length (Ld) of each of the shoulder short side portions (4B). In this way, the crown main grooves are specified to each have a relatively large crown long-short ratio. Therefore, a tire circumferential direction rigidity difference of land portions near the crown main grooves is increased, and deformation of the land portions due to rotation of the tire becomes larger, and thus stones once caught in the crown main grooves are likely to be ejected when in contact with a road surface. As a result, the anti-stone-biting performance is improved. Further, the shoulder main grooves are specified to each have a relatively small shoulder long-short ratio. Therefore, a tire circumferential direction rigidity difference of land portions adjacent to the shoulder main grooves is kept small and thus slipping of the land portions adjacent to the shoulder main grooves is suppressed. As a result, for example, heel-and-toe wear is largely reduced.

Further, a ground contact pressure during straight traveling is smaller in the land portions near the shoulder main grooves as compared to the land portions near the crown main grooves. Therefore, by specifying the shoulder long-short ratio (Lc/Ld) of the shoulder main grooves to be relatively small, drainage resistance of the shoulder main grooves is reduced and thus wet performance is improved.

Therefore, a tire according to an embodiment of the present invention allows the wear life performance, the anti-stone-biting performance and the wet performance to be improved in a well-balanced manner.

Obviously, numerous modifications and variations of the present invention are possible in light of the above teachings. It is therefore to be understood that within the scope of the appended claims, the invention may be practiced otherwise than as specifically described herein.

The invention claimed is:

1. A tire, comprising:
   a tread having a crown main groove continuously extending in a tire circumferential direction, and a plurality of shoulder main grooves continuously extending in the tire circumferential direction on tire axial direction outer sides of the crown main groove, respectively,
   wherein the crown main groove has a plurality of crown long side portions inclined to one side in an inclination direction with respect to the tire circumferential direction and a plurality of crown short side portions inclined in an opposite direction with respect to the inclination direction of the crown long side portions such that each crown short side portion has a length which is shorter than a length of each crown long side portion and that the crown long side portions and short side portions are alternately formed in a zigzag shape extending in the tire circumferential direction, the plurality of shoulder main grooves has a plurality of shoulder long side portions inclined to one side in an inclination direction with respect to the tire circumferential direction and a plurality of shoulder short side portions inclined in an opposite direction with respect to the inclination direction of the shoulder long side portions such that each shoulder short side portion has a length which is shorter than a length of each shoulder long side portion and that the shoulder long side portions and short side portions are alternately formed in a zigzag shape extending in the tire circumferential direction, and the crown main groove and shoulder main grooves are formed such that a crown long-short ratio La/Lb is in a range of 1.17 to 1.27 and larger than a shoulder long-short ratio Lc/Ld in a range of 1.01 to 1.11, where La is a length of each crown long side portion, Lb is a length of each crown short side portion, Lc is a length of each shoulder long side portion, and Ld is a length of each shoulder short side portion.

2. The tire according to claim 1, wherein the crown long-short ratio La/Lb is in a range of 1.1 to 1.2 times the shoulder long-short ratio Lc/Ld.

3. The tire according to claim 1, wherein the tread has the crown main groove formed in a plurality such that the plurality of crown main grooves is formed on both outer sides of a tire equator, respectively.

4. The tire according to claim 3, wherein the tread has a plurality of crown transverse grooves connecting the crown main grooves and a plurality of middle transverse grooves connecting one of the crown main grooves and an adjacent one of the shoulder main grooves such that the tread has a plurality of middle blocks divided by the crown main grooves, the shoulder main grooves and the middle transverse grooves, and the plurality of middle blocks has a plurality of middle sipes extending in the tire axial direction such that at least a portion of each of the middle sipes is extending in a region formed by projecting an adjacent crown transverse groove on a tire axial direction outer side.

5. The tire according to claim 4, wherein the crown and middle transverse grooves are formed such that the crown transverse grooves are inclined at an angle α3 in a range of 5 to 15 degrees with respect to the tire axial direction and that the middle transverse grooves are inclined at an angle α4 in a range of 5 to 15 degrees with respect to the tire axial direction.

6. The tire according to claim 3, wherein the tread has a plurality of crown transverse grooves connecting the crown main grooves and a plurality of middle transverse grooves connecting one of the crown main grooves and an adjacent one of the shoulder main grooves such that the tread has a plurality of middle blocks divided by the crown main grooves, the shoulder main grooves and the middle transverse grooves, and a plurality of crown blocks divided by a pair of the crown main grooves and the crown transverse grooves, and that a tire axial direction maximum width of each of the crown blocks is in a range of more than 1.00 times to 1.05 times or less a tire axial direction maximum width of each of the middle blocks.

7. The tire according to claim 6, wherein the tire axial direction maximum width of each of the crown blocks is in a range of 15% to 25% of a tread width of the tread.

8. The tire according to claim 7, wherein each of the middle transverse grooves has a groove width which is larger than a groove width of each of the crown transverse grooves.

9. The tire according to claim 6, wherein each of the middle transverse grooves has a groove width which is larger than a groove width of each of the crown transverse grooves.

10. The tire according to claim 9, wherein the groove width of each of the crown transverse grooves is in a range of 15% or more to 25% or less of one pitch of the crown transverse grooves, and the groove width of each of the middle transverse grooves is in a range of more than 15% to equal to or less than 25% of one pitch of the middle transverse grooves.

11. The tire according to claim 3, wherein the tread has a plurality of crown transverse grooves connecting the crown main grooves and a plurality of middle transverse grooves connecting one of the crown main grooves and an adjacent one of the shoulder main grooves such that the tread has a plurality of middle blocks divided by the crown main grooves, the shoulder main grooves and the middle transverse grooves, and a plurality of crown blocks divided by a pair of the crown main grooves and the crown transverse grooves, the plurality of crown blocks has a plurality of crown sipes extending across the crown blocks, the plurality of middle blocks has a plurality of middle sipes extending across the middle blocks, and the crown and middle sipes are formed such that an angle of each of the crown and middle sipes with respect to the tire axial direction is in a range of 15 to 75 degrees.

12. The tire according to claim 1, wherein the crown main groove is formed such that the crown main groove is inclined at an angle α1 in a range of 10 to 30 degrees with respect to the tire circumferential direction.

13. The tire according to claim 11, wherein each of the shoulder main grooves is formed such that each shoulder main groove is inclined at an angle α2 which is smaller than the angle α1 of the crown main groove with respect to the tire circumferential direction.

14. The tire according to claim 13, wherein the crown long-short ratio La/Lb is in a range of 1.1 to 1.2 times the shoulder long-short ratio Lc/Ld.

15. The tire according to claim 13, wherein the tread has the crown main groove formed in a plurality such that the plurality of crown main grooves is formed on both outer sides of a tire equator, respectively.

16. The tire according to claim 15, wherein the tread has a plurality of crown transverse grooves connecting the crown main grooves and a plurality of middle transverse grooves connecting one of the crown main grooves and an adjacent one of the shoulder main grooves such that the tread has a plurality of middle blocks divided by the crown main grooves, the shoulder main grooves and the middle transverse grooves, and the plurality of middle blocks has a plurality of middle sipes extending in the tire axial direction such that at least a portion of each of the middle sipes is extending in a region formed by projecting an adjacent crown transverse groove on a tire axial direction outer side.

17. The tire according to claim 15, wherein the tread has a plurality of crown transverse grooves connecting the crown main grooves and a plurality of middle transverse grooves connecting one of the crown main grooves and an adjacent one of the shoulder main grooves such that the tread has a plurality of middle blocks divided by the crown main grooves, the shoulder main grooves and the middle transverse grooves, and a plurality of crown blocks divided by a pair of the crown main grooves and the crown transverse grooves, and that a tire axial direction maximum width of each of the crown blocks is in a range of more than 1.00 times to 1.05 times or less a tire axial direction maximum width of each of the middle blocks.

18. The tire according to claim 17, wherein the tire axial direction maximum width of each of the crown blocks is in a range of 15% to 25% of a tread width of the tread.

19. The tire according to claim 1, wherein the crown and shoulder main grooves are formed such that a groove width W1 of the crown main groove is smaller than a groove width W2 of the shoulder main grooves.

20. The tire according to claim 1, wherein the tread has the crown main groove formed in a plurality such that the plurality of crown main grooves is formed on both outer sides of a tire equator, respectively, and the tread has a plurality of middle sipes formed in a zigzag shape and extending between the crown main grooves and the shoulder main grooves, and a plurality of crown sipes formed in a zigzag shape and extending between the crown main grooves.

* * * * *